US 6,539,757 B2

(12) United States Patent
Witchey (10) Patent No.: US 6,539,757 B2
(45) Date of Patent: Apr. 1, 2003

(54) E-SERIES SKID STEER LOCK (76) Inventor: Bryan Witchey, 209 Fairway Cir., Cross Junction, VA (US) 22625

( * ) Notice: Subject to any disclaimer, the term of this patent is extended or adjusted under 35 U.S.C. 154(b) by 0 days.

(21) Appl. No.: 10/062,403

(22) Filed: Feb. 5, 2002

(65) Prior Publication Data

US 2002/0104340 A1 Aug. 8, 2002

Related U.S. Application Data (60) Provisional application No. 60/266,630, filed on Feb. 5, 2001, and provisional application No. 60/266,629, filed on Feb. 5, 2001.

(51) Int. Cl.[7] ............................................. F16H 57/00
(52) U.S. Cl. ....................................................... 70/202
(58) Field of Search .............................. 70/14, 18, 19, 70/57, 58, 198–203, 209, 238, 247

(56) References Cited

U.S. PATENT DOCUMENTS

| 1,165,352 A | * | 12/1915 | Whiteside | 70/201 |
| 1,219,488 A | * | 3/1917 | Rompf | 70/201 X |
| 1,256,132 A | * | 2/1918 | Hillburg | 70/201 X |
| 1,280,690 A | * | 10/1918 | Eckert | 70/201 X |
| 1,338,945 A | * | 5/1920 | Manley | 70/201 X |
| 1,371,886 A | * | 3/1921 | Gage | 70/201 X |
| 1,385,479 A | * | 7/1921 | Stanley | 70/201 X |
| 1,442,203 A | * | 1/1923 | Williams | 70/201 X |
| 1,444,379 A | * | 2/1923 | Jones | 70/201 X |
| 1,453,004 A | * | 4/1923 | Collion | 70/201 X |
| 1,473,469 A | * | 11/1923 | Cynamon | 70/201 X |
| 1,815,417 A | * | 7/1931 | Miller | 70/201 |
| 2,471,293 A | * | 5/1949 | Truesdell | 70/254 |
| 3,810,369 A | * | 5/1974 | Giovanniello | 70/202 |
| 4,008,590 A | | 2/1977 | Berkowitz et al. | 70/424 |
| 4,426,861 A | * | 1/1984 | Chillis | 70/39 |
| 4,693,099 A | * | 9/1987 | Cykman | 70/247 |
| 5,228,320 A | * | 7/1993 | Liou | 70/247 |
| 5,295,375 A | * | 3/1994 | Jonas | 70/247 |
| 5,331,307 A | | 7/1994 | Eizen | 340/426 |
| 5,372,019 A | * | 12/1994 | Hsiao | 70/209 X |
| 5,444,999 A | * | 8/1995 | Hsiao | 70/247 |
| 5,454,244 A | * | 10/1995 | Liou | 70/247 |
| 5,487,286 A | * | 1/1996 | Wu | 70/247 X |
| 5,570,600 A | | 11/1996 | Hua | 70/247 |
| 5,572,889 A | * | 11/1996 | Ping-Hua | 70/247 |
| 5,713,230 A | * | 2/1998 | Wang | 70/247 |
| 5,778,710 A | * | 7/1998 | Hu et al. | 70/247 |
| 5,823,021 A | * | 10/1998 | Chang | 70/38 A |
| 5,896,766 A | * | 4/1999 | Tovey | 70/202 |
| 5,921,116 A | * | 7/1999 | Goldenberg | 70/18 |
| 5,950,464 A | * | 9/1999 | Tonne | 70/247 |
| 6,393,877 B1 | * | 5/2002 | Church | 70/57 X |

* cited by examiner

Primary Examiner—Suzanne Dino Barrett
(74) Attorney, Agent, or Firm—Richard C. Litman (57) ABSTRACT An E-series skid steer lock having a mounting plate, a base plate and a bar member. The base plate is positioned on the safety cage inside a skid loader cab and is bolted to a mounting plate one the safety cage outside the skid loader cage. The bar member is used to restrict the motion of the skid loaders drive control lever by attaching the bar member to the base plate. Once the bar member is attached to the base plate it is locked in position with a locking mechanism.

4 Claims, 12 Drawing Sheets

E-SERIES SKID STEER LOCK

CROSS-REFERENCE TO RELATED APPLICATION

This application claims the benefit of U.S. Provisional Patent Application Serial Nos. 60/266,630 and 60/266,629, both filed Feb. 5, 2001.

BACKGROUND OF THE INVENTION

1. Field of the INVENTION

The present invention generally to anti-theft devices for vehicles. More specifically, the invention is an theft deterrent device for a skid steer utility loader (skid loader).

2. Description of the Related Art

Skid loaders, such as the Bobcat-type vehicle, are the best selling type of all-purpose heavy machinery in the United States. Unfortunately, this popularity has made the skid loader the most often stolen piece of all-purpose heavy equipment, resulting in hundreds of millions of dollars of losses every year. Therefore, there is a need for a small, economical, locking device which will immobilize a drive control lever of a skid loader and thereby render the machine unusable.

U.S. Pat. No. 5,331,307, issued to Eizen, and U.S. Pat. No. 5,570,600, issued to Hua, disclose vehicle anti-theft devices which use a U-bar to lock a vehicle's gear shift in a parked position. These inventions are distinguishable because of the use a bracket secured to a vehicle's interior to secure the U-bar. These inventions are also designed solely to secure a gear shift and do not teach securing a skid loader's drive lever.

U.S. Pat. No. 4,008,590, issued to Berkowitz et al., discloses a lock using a U-bar. This lock is distinguishable because it is designed to prevent access to the ignition slot of a vehicle. The '590 patent is not designed to prevent the operation of a skid loader.

None of the above inventions and patents, taken either singly or in combination, is seen to describe the instant invention as claimed. Thus an E-series skid steer lock solving the aforementioned problems is desired.

SUMMARY OF THE INVENTION

The E-series skid steer lock is an anti-theft device for a skid steer utility loader (skid loader). The device is attached to the safety cage of the skid loader and is designed to immobilize one of the loader's drive controls.

One embodiment of the device has a locking plate, a mounting plate and a bar member (U-bar). The locking plate and mounting plate are bolted together with a portion of the safety cage of a skid loader sandwiched between. The bent portion of the U-bar loops around and immobilizes one of the skid loader's drive control levers and the two ends of the U-bar enter two sleeves welded at right angles to the locking plate. The U-bar is locked to the locking plate with a spring loaded locking device which inserts a pin into one of several holes defined in the U-bar. When not in use, the U-bar may be stored in a storage sleeve which is welded parallel to the locking plate.

A second embodiment of this invention has a bar member, a base plate and a mounting plate. The base plate and the mounting plate are bolted to one another with the safety cage sandwiched between as in the first embodiment. The bar member has a cylindrical bar extending from a locking plate. When in use the locking plate slidably mounts on the base plate and is locked in position with a spring loaded locking device. The entire invention is positioned inside the cab of a skid loader such that the bar portion of the locking member secures one drive control lever either in the completely forward or the completely backward position.

Accordingly, it is a principal object of the invention to provide a theft deterrent device for skid loader construction vehicles.

It is another object of the invention to reduce the loss of skid loader construction vehicles.

It is a further object of the invention to prevent the unauthorized use of skid loader construction machinery.

Still another object of the invention is to provide a theft deterrent device that is easily and conveniently stored when not in use.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The E-series skid steer lock 10 is used to immobilize the drive control lever L of a skid steer utility loader (skid loader).

Figure 1:
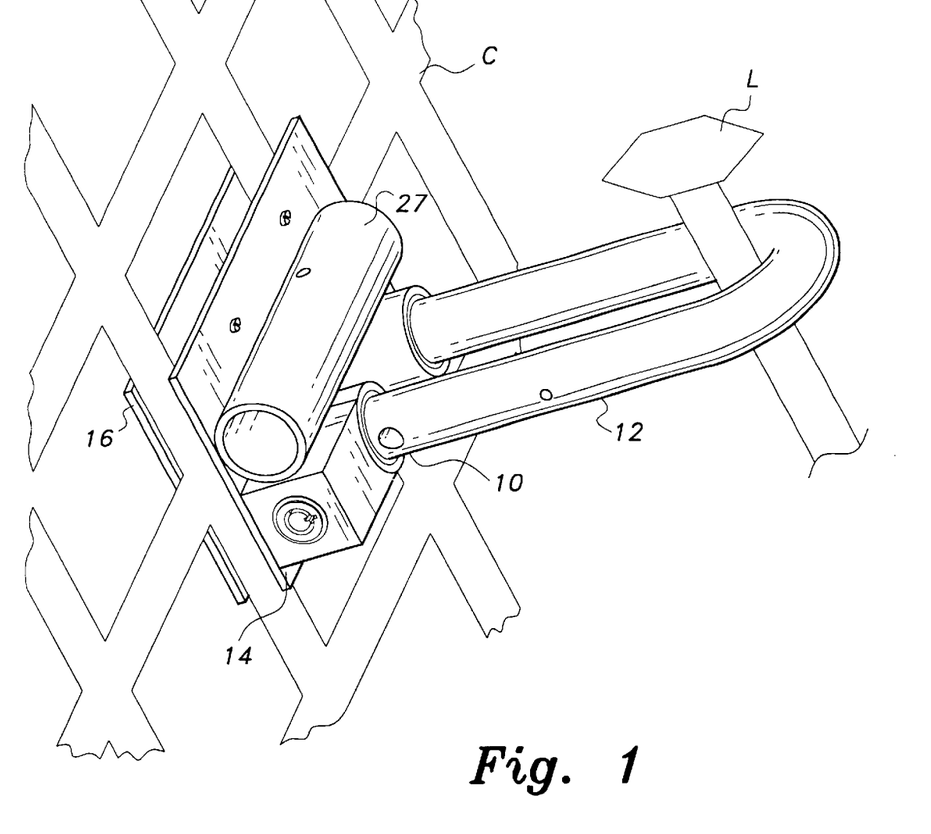
FIG. 1 is an environmental, perspective view of an E-series skid steer lock attached to the safety cage of a skid loader.

FIG. 1 shows the first embodiment of the E-series skid steer lock connecting a skid loader's drive control lever to the loader's safety cage C making the loader impossible to operate.

Figure 2A:
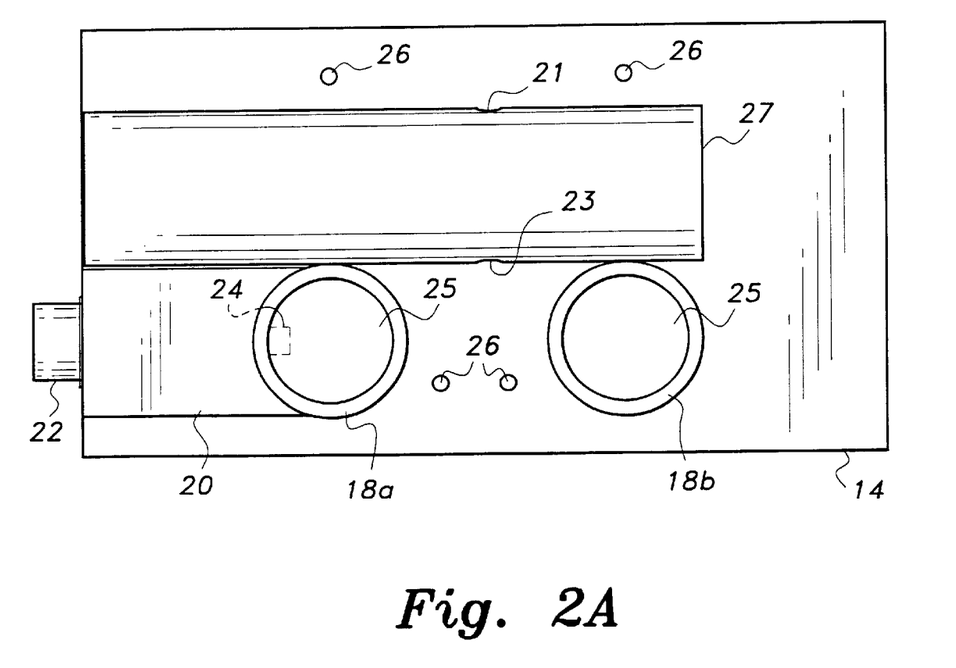
FIG. 2A is a front view of the base plate of an E-series skid steer lock.

The first embodiment has a locking member (U-bar) 12, a base plate 14, and a mounting plate 16. The base plate 14 is a flat rectangular plate with several holes 26 defined therein. As seen in FIG. 2A, there are four circular bolt holes 26 and apertures 25 defined in the base plate. Two metal sleeves 18a, 18b are welded at right angles to the front surface of the base plate 14, aligned with each aperture 25. The sleeves 18a, 18b and apertures 25 are sized and positioned on the base plate 14 so as to allow the two ends of the U-bar 12 (discussed below) to pass through them. A storage sleeve 27 is welded transversely across the base plate 14 contiguous to the sleeves 18a and 18b.

Figure 2B:
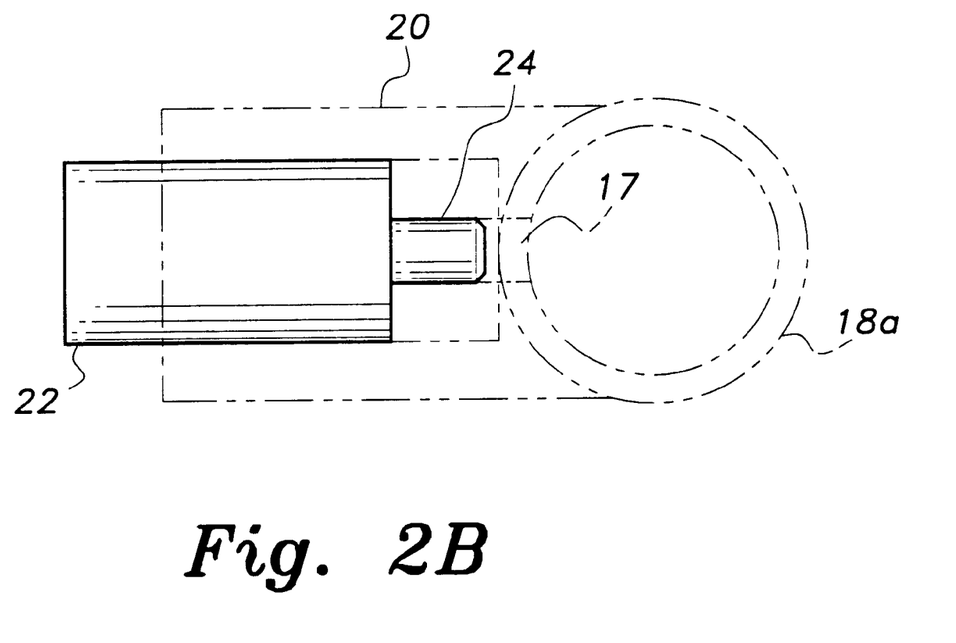
FIG. 2B is a diagrammatic side view showing the lock pin in an unlocked position, the base plate being shown in phantom.
Figure 2C:
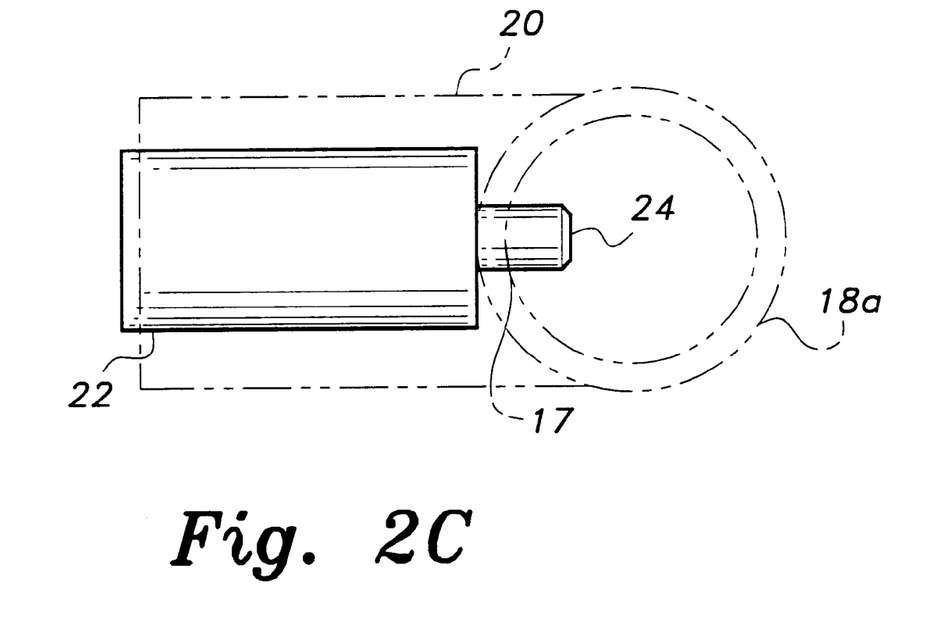
FIG. 2C is a diagrammatic side view showing the lock pin in a locked position, the base plate being shown in phantom.

A lock housing 20 is welded to the base plate 14 adjacent to one sleeve 18a. As shown in FIG. 2B, a spring loaded locking mechanism 22 is positioned inside the housing 20. This type of locking mechanism is well known in the art. A pin 24 is part of the locking mechanism 22. A hole 17 is defined in sleeve 18a. FIG. 2B shows the locking mechanism in its unlocked position. Pushing the locking mechanism 22 toward sleeve 18a will cause the locking mechanism 22 to shift into its locked position, which is shown in FIG. 2C. When in the locked position, the lock pin 24 protrudes though hole 17. Preferably a key is used to release the locking mechanism 22 and allow it to shift back to the unlocked position.

Figure 3:
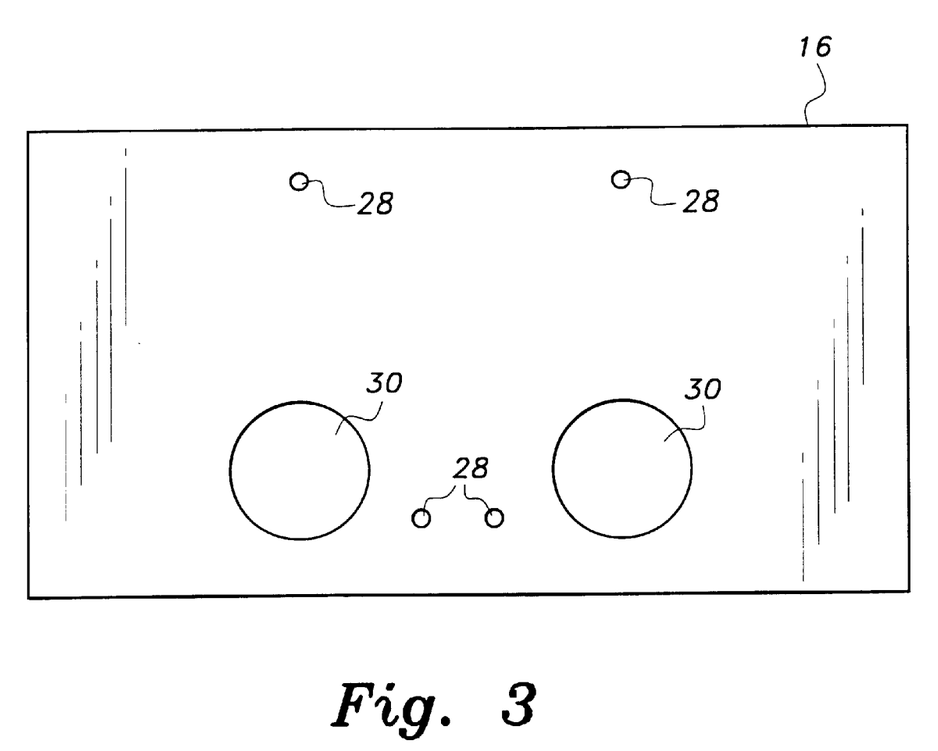
FIG. 3 is a front view of the mounting plate of an E-series skid steer lock.

FIG. 3 shows the flat, rectangular mounting plate 16. Four circular bolt holes 28 and two apertures 30 are defined in the mounting plate. The bolt holes 28, and the apertures 30 are in positions similar to the positions of the bolt holes 26 and the apertures 25 on the base plate 14.

Figure 4:
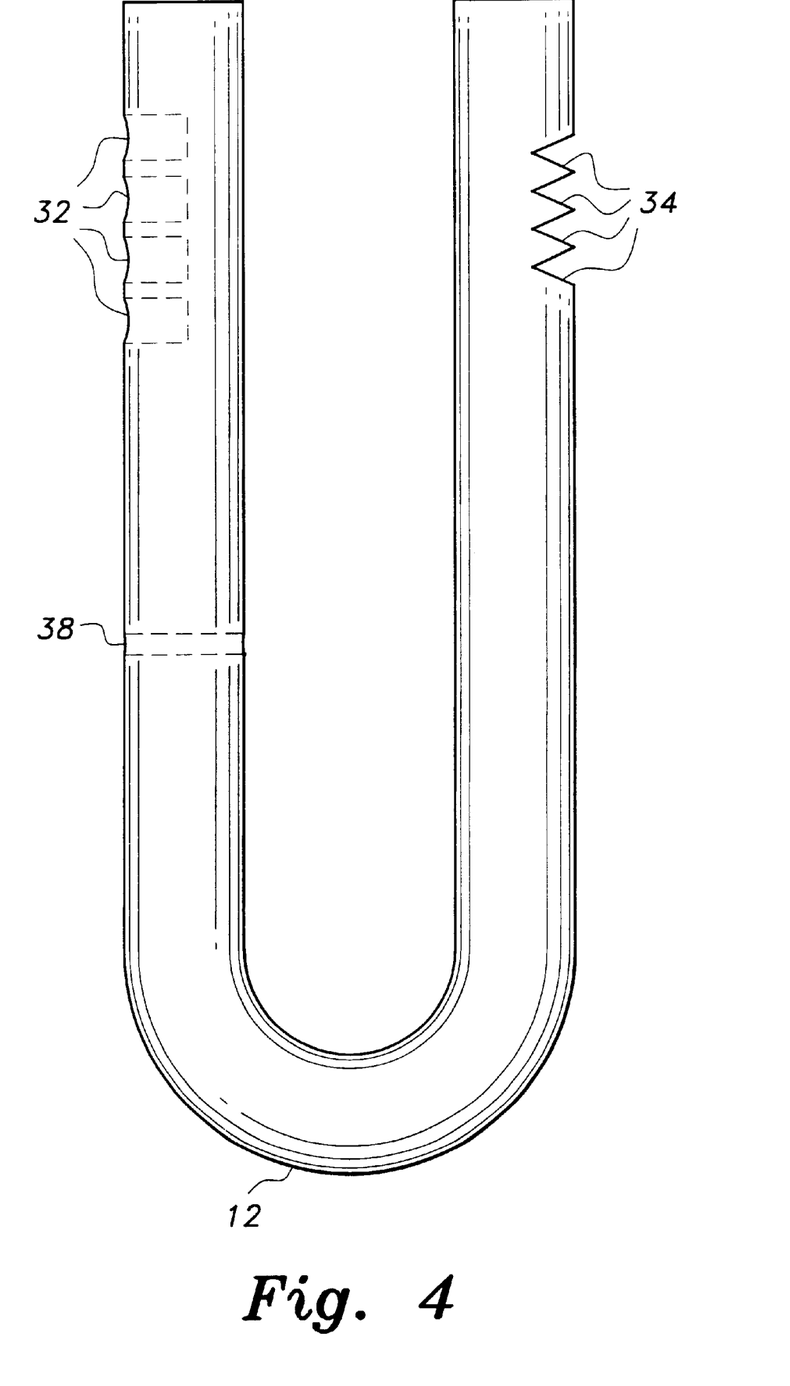
FIG. 4 is a top view of a U-bar.

FIG. 4 shows the U-bar 12. The U-bar 12 has two straight parallel legs joined by an arcuate portion. Several circular holes 32 are defined along one leg of the U-bar 12 adjacent the free end of the leg. These holes 32 are blind holes and do not cut through the bar. One additional hole 38 is defined through the leg which penetrates the entire width of the U-bar 12.

There are two methods of attachment and use of an E-series skid steer lock 10. In the first method, shown in FIG. 1, the base plate 14 is positioned on the inside of the safety cage C of a skid loader, adjacent to a drive control lever L. The mounting plate 16 is positioned on the outside of the safety cage directly adjacent to the base plate 14 and secured thereto with four bolts. These bolts preferably are non-reversing and have the threads covered with a small amount of friction activated adhesive. The bolts travel through holes 26 in the base plate 14, through the cage C and continue through holes 28 in the mounting plate. The arcuate portion of the U-bar 12 is looped around the drive lever L and the legs of the U-bar 12 are positioned inside the sleeves 18a, 18b attached to the base plate 14, as shown in FIG. 1. The locking mechanism 22 is used to secure pin 24 inside one of the holes 32 defined in the U-bar 12, as shown in FIG. 2B. Grooves 34 cut into the U-bar 12 may be substituted for the holes 32.

The E-series skid steer lock may also be attached to a safety cage in a second configuration. The base plate 14 may be mounted to the outside of the safety cage, and the mounting plate 16 positioned inside the safety cage and bolted to the base plate 14. The U-bar 12 would loop around the drive control lever L of the skid loader in the same manner as above but it would enter the apertures 30 defined on the mounting plate 16 before going through the base plate 14 and entering the sleeves 18a, 18b welded to the base plate 14.

Figure 5A:
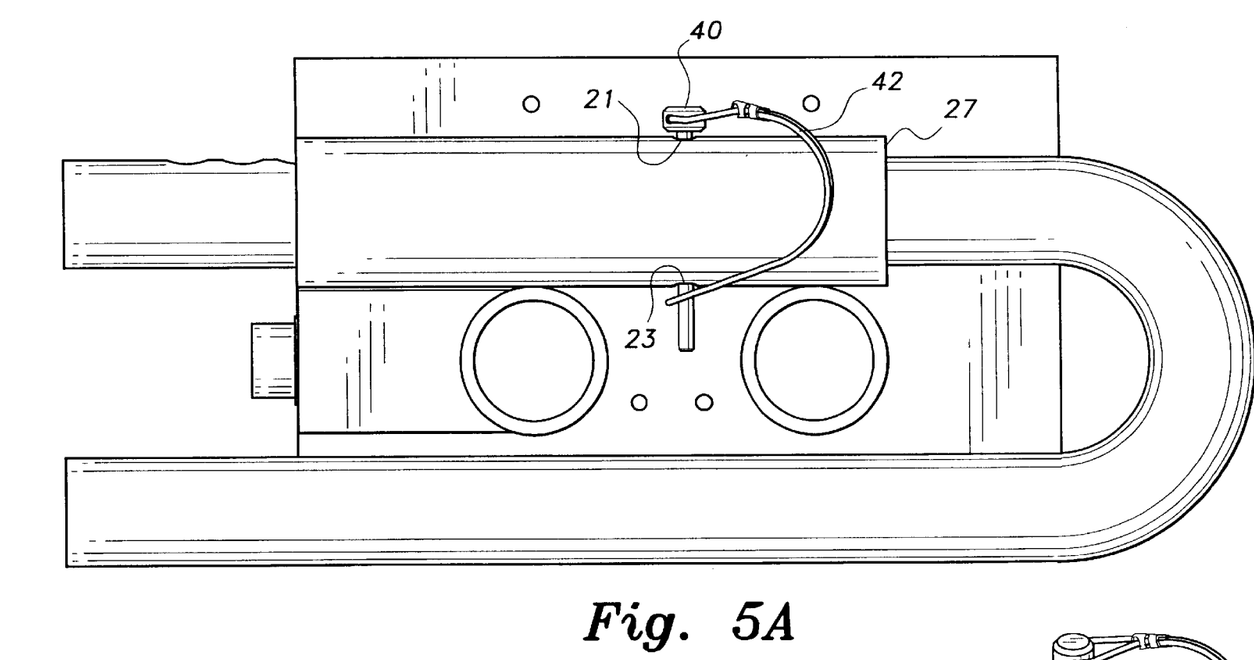
FIG. 5A is a front view of the base plate of an E-series skid steer lock with the U-bar in the storage position.
Figure 5B:
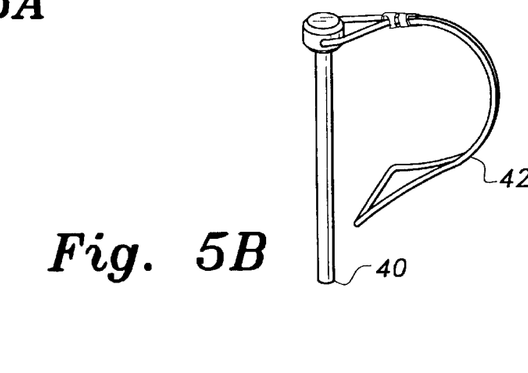
FIG. 5B is a side view of a locking pin and spring clip.

When the E-series skid steer lock 10 is not in use, the U-bar 12 may be stored, as shown in FIG. 5A, by inserting one leg of the U-bar into the storage sleeve 27. Pin 40, pictured in FIG. 5B, with a spring clip 42 pivotally attached to its head is used to secure the U-bar 12 in the cylinder 27. The pin 40 is inserted into hole 21 defined in the storage sleeve 27, proceeds through hole 38 defined in the U-bar 12 and emerges from the storage sleeve 27 through hole 23. The spring clip 42 holds the pin in place.

Figure 6:
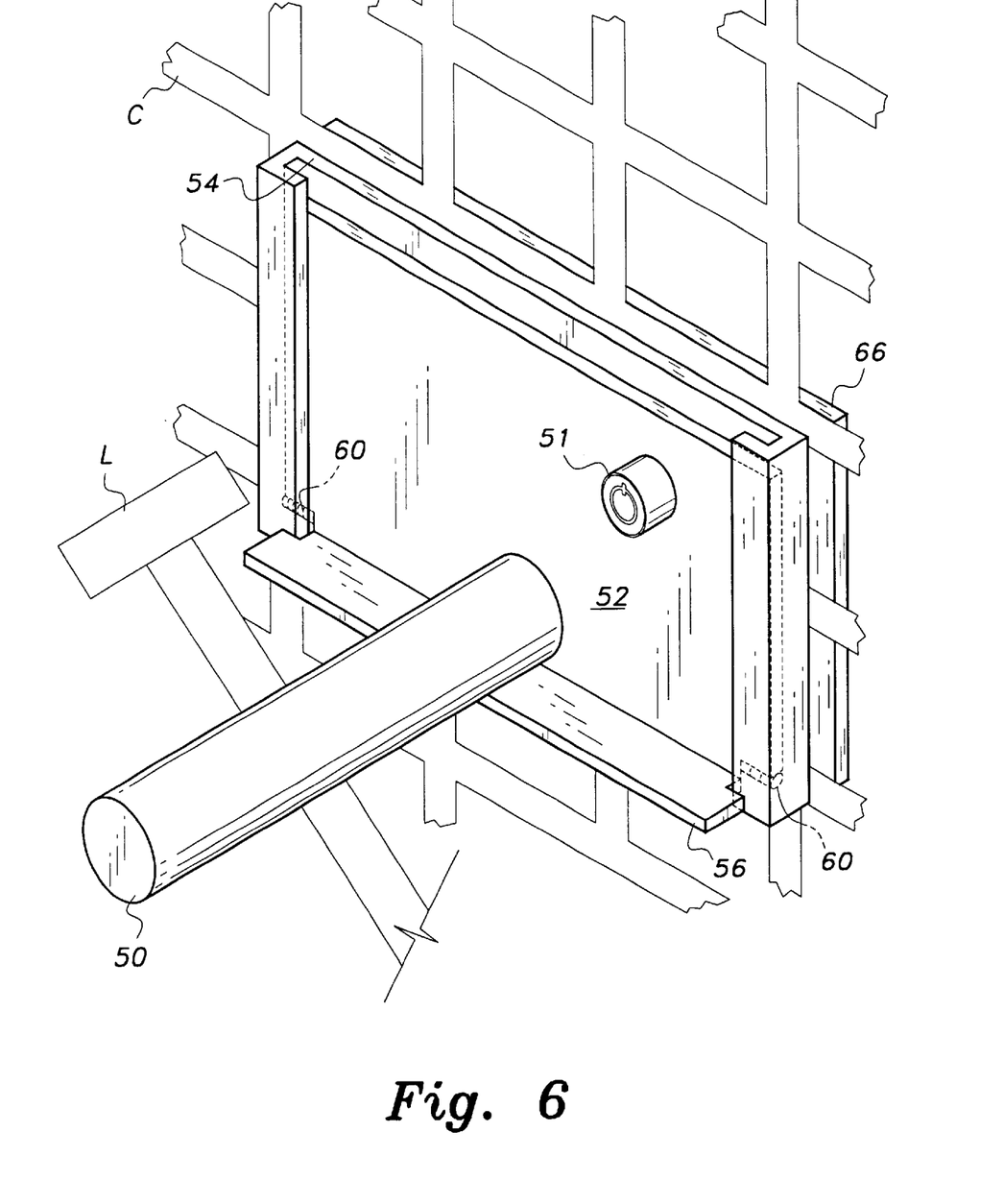
FIG. 6 is an environmental view of a second embodiment of the E-series skid steer lock.

A second embodiment of the E-series skid steer lock is pictured in FIG. 6. This embodiment has a bar member, base plate, and a mounting plate. The bar member has a bar 50, lock plate 52 and storage plate 56 joined into a unitary structure. The bar 50 is a cylindrical bar. The bar 50 is welded to the middle of one side of the rectangular lock plate 52. A rectangular storage plate 56 is welded at a right angle to the bottom of the lock plate 52. Both the lock plate 52 and the storage plate 56 are adapted to slidably connect to a rectangular base plate 54. The base plate 54 is bolted to a mounting plate 66 with a portion of a skid loader safety cage C sandwiched between the two plates.

Figure 7A:
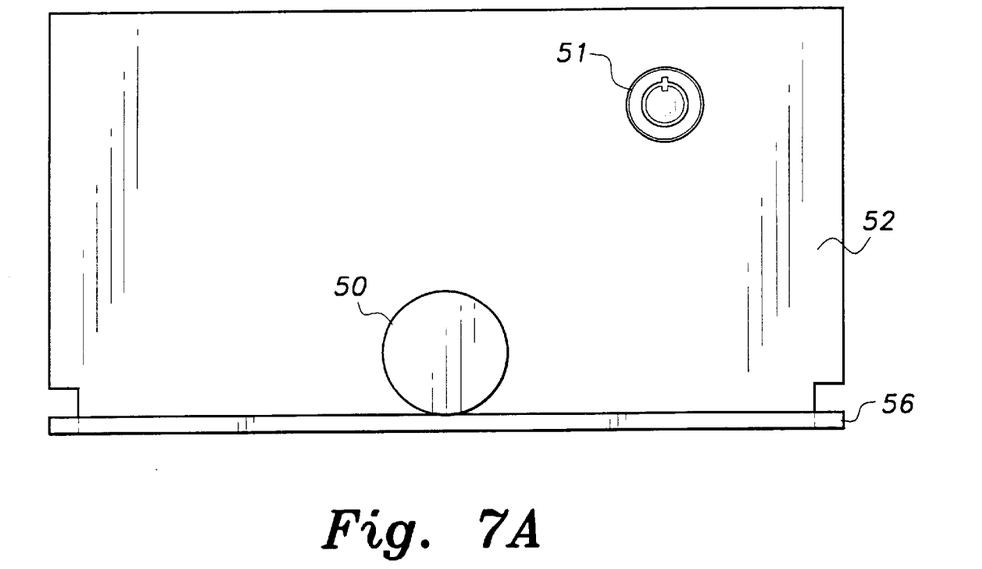
FIG. 7A is a front view of the locking member of the E-series skid steer lock of FIG. 6.
Figure 7B:
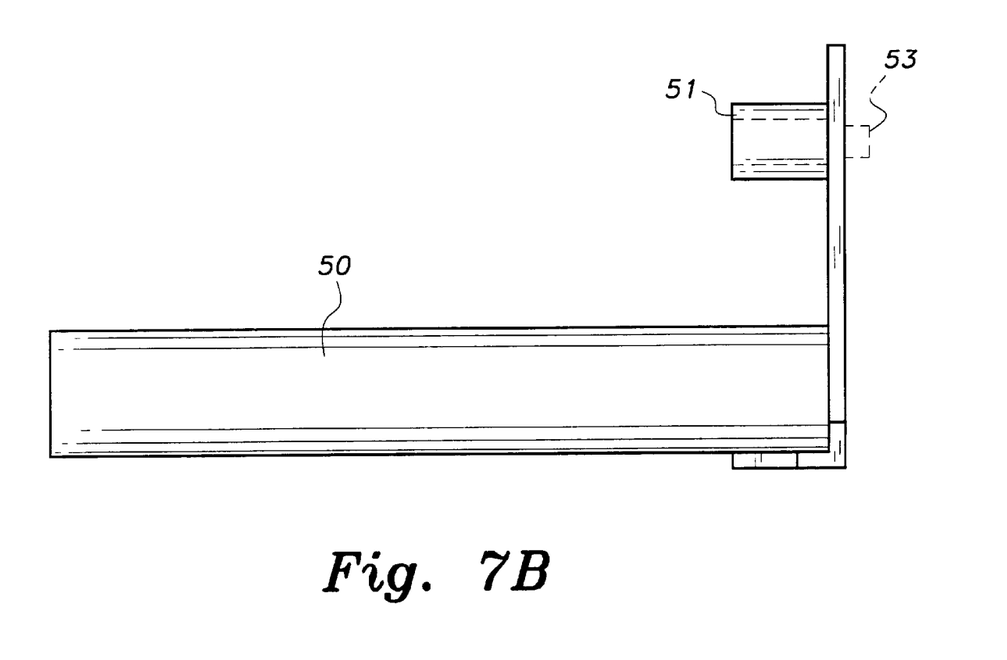
FIG. 7B is a side view of the locking member of the E-series skid steer lock of FIG. 6.
Figure 7C:
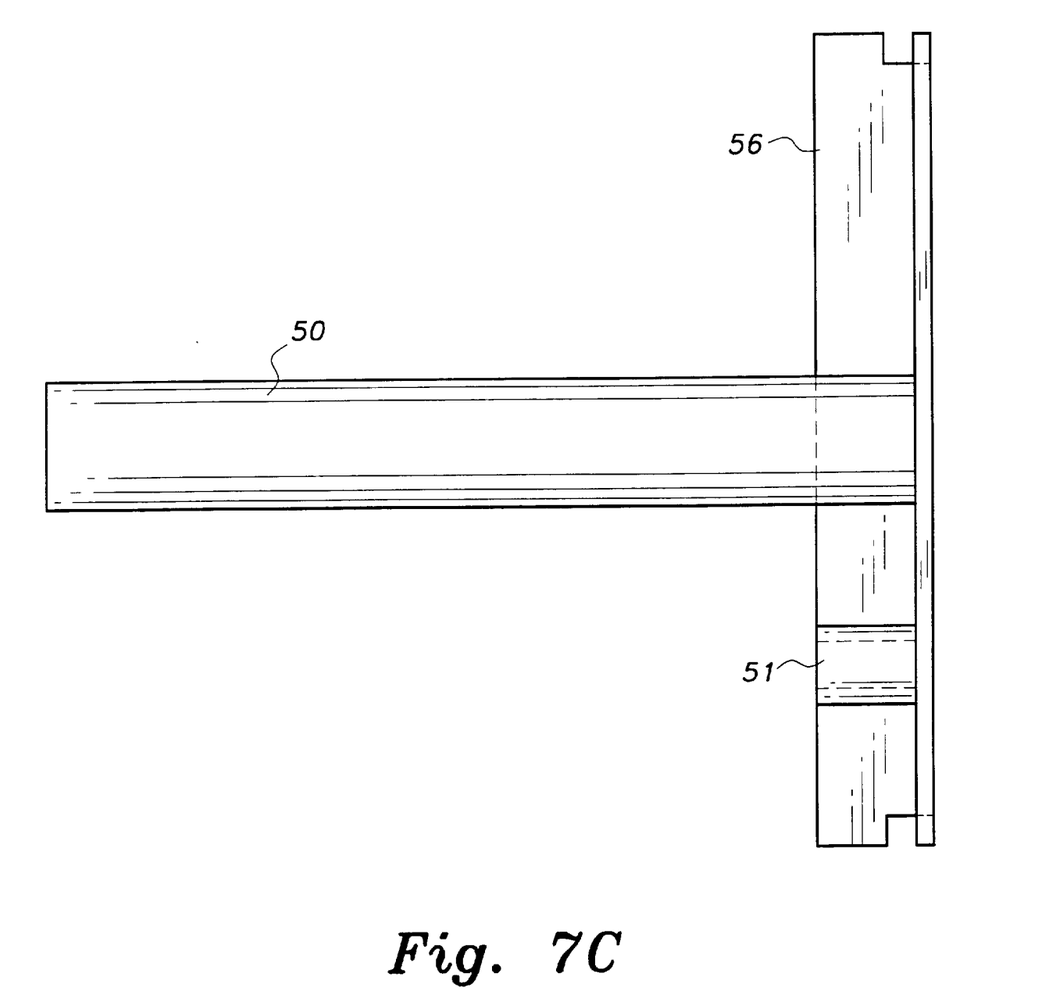
FIG. 7C is a top view of the locking member of the E-series skid steer lock of FIG. 6.

FIG. 7A is a front view of the bar member. The lock plate has a key operated, spring-loaded lock mechanism 51. As detailed in the first embodiment of the invention, when the lock is pressed toward the lock plate a pin 53 extends through the lock plate 52 and into a hole defined in the base plate 54, as shown in FIG. 7B. FIG. 7C is a bottom view of the bar member that clearly shows the storage plate 56.

Figure 8A:
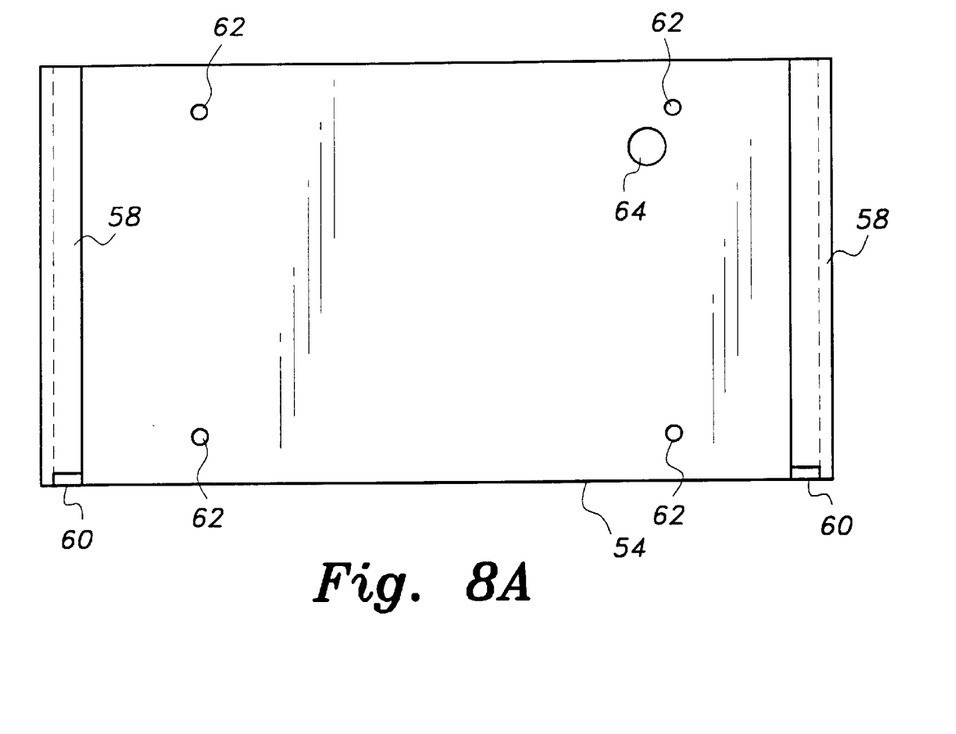
FIG. 8A is a top view of the base plate of the E-series skid steer lock of FIG. 6.
Figure 8B:
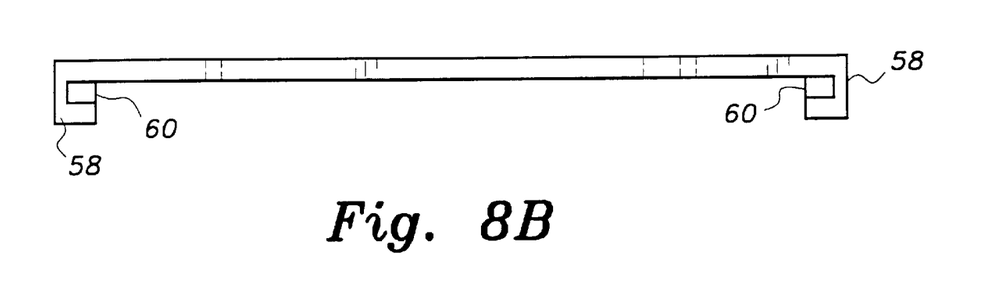
FIG. 8B is a front view of the base plate of the E-series skid steer lock of FIG. 6.

FIGS. 8A and 8B show respectively the front and top of the base plate 54. The base plate 54 has a front surface (shown in FIG. 8A), back surface, and two opposing L-shaped guide rails 58 defining tracks. The rails 58 extend in front of the front surface of the base plate 54. The distance between the front surface of the base plate 54 and the front leg of each rail 58 is greater than the thickness of either the locking plate 52 or the storage plate 56. A stopper 60 is welded between each rail 58 and the base plate 54. Four bolt holes 62 and a pin hole 64 are defined in the base plate 54. Four bolts travel through the bolt holes 62 and secure the base plate to a mounting plate 66.

Figure 9A:
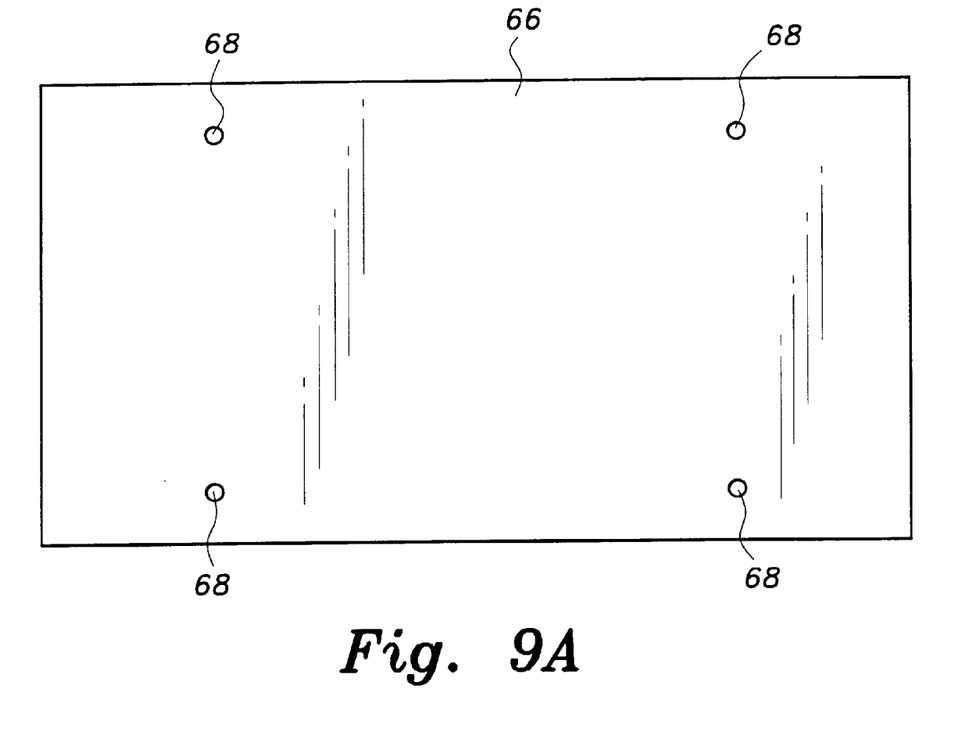
FIG. 9A is a front view of the mounting plate of the E-series skid steer lock of FIG. 6.
Figure 9B:
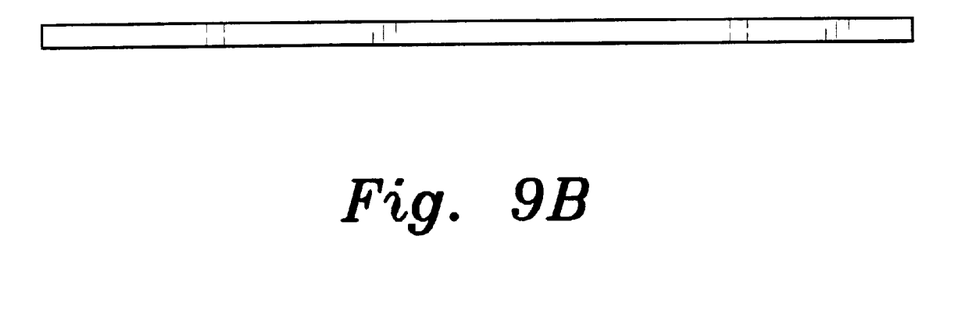
FIG. 9B is a top view of the mounting plate of the E-series skid steer lock of FIG. 6.

FIGS. 9A and 9B show respectively the front and top of the rectangular mounting plate 66 and the four bolt holes 68 defined therein.

Figure 10:
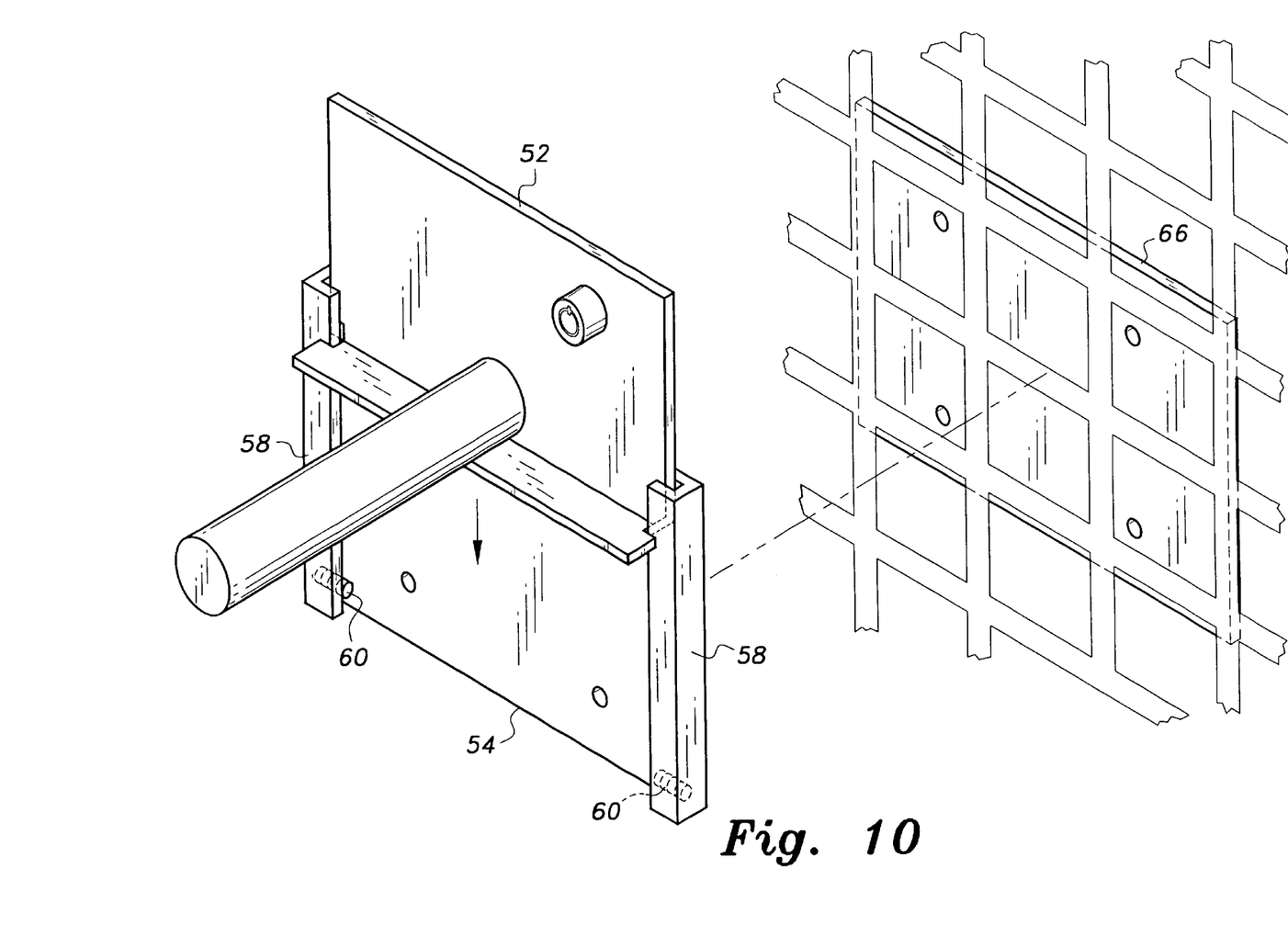
FIG. 10 is an exploded perspective view of the E-series skid steer lock of FIG. 6.

When in use, the base plate 54 is positioned on the inside of the safety cage and bolted to the mounting plate 66 which is positioned adjacent to the base plate 54 on the outside of the safety cage, as shown in FIG. 10. The lock plate 52 is slidably attached to the base plate 54. The lock plate 52 and attached lock bar 50 are held in position by the rails 58 and the stoppers 60. A locking device 51 is used to position a pin into a pin hole 64 defined in the base plate 54. The locking device 51 thereby prevents the unwanted removal of the locking plate 52 and the attached lock bar 50. The base plate 54 and mounting plate 66 are preferably positioned near the front or the rear of the safety cage such that when the lock plate 52 is attached to the base plate 54 the lock bar 50 will hold the drive lever of a skid loader either in the complete forward or complete reverse position making the skid loader nearly impossible to drive.

When this embodiment of the E-series skid steer lock is not in use it may be stored using the storage plate 56. The storage plate is slidably attached to the base plate between the front surface and the rails 58. In this configuration the lock bar 50 is in a vertical rather than a horizontal position which prevents the lock bar from interfering with the normal operation of the skid loader drive levers.

It is to be understood that the present invention is not limited to the embodiments described above, but encompasses any and all embodiments within the scope of the following claims.

I claim:

1. An E-series skid steer lock comprising:

a mounting plate having a plurality of bolt holes defined therein;

a base plate having a plurality of bolt holes, and two apertures defined therein;

two sleeves oriented normal to said base plate and aligned with each said aperture;

a locking mechanism disposed on said base plate adjacent to one said sleeve;

a U-bar having an arch shaped portion and two parallel leg portions, said leg portions capable of being positioned inside said two sleeves;

a storage sleeve oriented parallel to said base plate disposed on said base plate adjacent to said sleeves, and the storage sleeve having two holes defined therein, the holes capable of allowing a pin to pass through said storage sleeve;

a pin having a head end and a shaft body, and said pin is disposed in the holes defined in said storage sleeve; and a spring clip disposed on the head of said pin;

wherein said locking mechanism is capable of securing said U-bar inside said sleeve;

wherein said base plate is adapted to connect to said mounting plate through the grid of a cage;

wherein said storage sleeve is larger in internal circumference than said U-bar is in external circumference;

wherein said spring clip is capable of securing said pin in said storage sleeve;

wherein said U-bar has a hole defined in one side capable of receiving said pin.

2. An E-series skid steer lock as in claim, further comprising:

a housing disposed around said locking mechanism;

said locking mechanism being a spring loaded lock mechanism having a pin portion;

wherein said U-bar has several holes defined along one side, and said holes are larger in diameter than the pin portion of said locking mechanism.

3. An E-series skid steer lock comprising:

a mounting plate having a plurality of bolt holes defined therein;

a base plate having a plurality of bolt holes, and a lock pin hole defined therein;

two rails disposed along the sides of and in front of said base plate;

two stoppers one disposed between said base plate and each said rail;

a lock plate disposed between said rails and said base plate;

a locking mechanism disposed on said lock plate;

a bar disposed on said lock plate; and a storage plate disposed on one edge of said lock plate.

4. An E-series skid steer lock as in claim 3 wherein:

said locking mechanism is a spring loaded lock having a lock pin; and said lock pin is disposed on said lock plate in a position to interface with said base plate.

* * * * *